United States Patent [19]
Kontos

[11] 3,853,969
[45] Dec. 10, 1974

[54] CRYSTALLIZABLE STEREOBLOCK RUBBERY COPOLYMERS

[75] Inventor: Emmanuel G. Kontos, New Haven, Conn.

[73] Assignee: United States Rubber Company, New York, N.Y.

[22] Filed: Oct. 17, 1960

[21] Appl. No.: 63,050

[52] U.S. Cl. .................. 260/878 B, 260/79.5 C
[51] Int. Cl. ........................................ C08f 15/04
[58] Field of Search ............ 260/45.5 P, 45.5 AC, 260/45.5 MP, 878 B

[56] References Cited
UNITED STATES PATENTS
3,784,502   1/1974   Gobran et al. .................. 260/878 B Primary Examiner—Harry Wong, Jr.
Assistant Examiner—A. Holler
Attorney, Agent, or Firm—Willard R. Sprowls, Esq.

[57] ABSTRACT

This invention relates to a method of making crystallizable stereoblock rubbery copolymers by block polymerization of 1-olefins having from 2 to 12 carbon atoms. This involves forming successive and alternating polymeric blocks, one of which is formed by contacting simultaneously ethylene or propylene with a dissimilar 1-olefin having from 3 to 12 carbon atoms with a non-stereospecific catalyst in an inert liquid hydrocarbon solvent at 0°–100°C. The feed is so regulated that the thus formed block is an amorphous non-crystallizable atactic copolymer containing from 100 to 2,000 monomer units and in which the molar ratio of the ethylene or propylene component to the dissimilar 1-olefin is from 20:80 to 80:20. The other polymeric block referred to is formed by contacting a single 1-olefin having from 2 to 12 carbon atoms under the same polymerization conditions, the feed being controlled so that the block thus formed is a crystallizable homopolymer block containing from 20 to 200 monomer units in the case of ethylene and from 200 to 1,000 monomer units in the case of 1-olefins having from 3 to 12 carbon atoms. The non-stereospecific catalyst is an ionic-coordination complex of the Ziegler-type capable of polymerizing alpha-olefins in atactic isomery. This invention also relates to the resulting crystallizable stereoblock rubbery copolymers and vulcanizates thereof. The unvulcanized copolymers are amorphous in the undeformed state and are capable of crystallization upon stretching. They have at least three successive and alternating polymeric blocks as described above.

18 Claims, 7 Drawing Figures

CRYSTALLIZABLE STEREOBLOCK RUBBERY COPOLYMERS

This invention relates to novel crystallizable stereoblock rubbery copolymers of 1-olefins and to methods for preparing the same. More particularly, this invention relates to crystallizable stereoblock copolymers of 1-olefins possessing rubber-like properties.

The term "stereoblock copolymer" as used herein, characterizes those copolymers in which the polymerized monomers are arranged along the polymeric chain with a certain spatial (stereo) arrangement and in such an order that alternating blocks of (1) copolymers or interpolymers and homopolymers, or (2) dissimilar copolymers or interpolymers, are obtained. The term "1-olefins," as used herein, is meant to include ethylene and higher 1-alkenes, commonly known as alpha-olefins, having a sole double bond situated between the first and second carbon atoms of the carbon chain.

It has been known heretofore that 1-olefins, having the general formula $CH_2=CHR$, wherein R is a hydrogen atom or an alkyl group, may be homopolymerized and copolymerized by means of ionic-coordination catalysts, sometimes called Ziegler-type catalysts, which are obtained by reacting a transition metal compound with an organometallic compound.

Structural investigations of homopolymers of alpha-olefins, represented by the formula $+CH_2-CHR+_n$, wherein R is an alkyl group, obtained by the use of Ziegler-type catalysts, have shown that, depending on the specific spatial orientation of the R substituent, it is possible to distinguish isotactic, syndiotactic and atactic homopolymers. Isotactic and syndiotactic homopolymers of alpha-olefins usually possess well-defined crystalline structures and are plastic compounds. Atactic homopolymers of alpha-olefins usually do not form definite crystalline structures and are generally amorphous, but, in some instances they have the ability to crystallize upon stretching, in the same manner that natural rubber crystallizes upon stretching.

In the prior art, specific Ziegler-type catalysts have been used successfully to produce (1) crystalline, plastic-like, isotactic and syndiotactic homopolymers, and (2) non-crystalline, atactic homopolymers.

It is also known that 1-olefins may be copolymerized, using catalysts of the Ziegler-type, to produce copolymers having a random distribution of the monomeric units along the polymeric backbone. These random copolymers are non-crystalline, rubber-like products or crystalline plastic-like products depending on the specific Ziegler-type catalyst and polymerization process used. Thus, random copolymers prepared with stereospecific Ziegler-type catalysts generally produce crystalline copolymers while non-stereospecific Ziegler-type catalysts are used to prepare non-crystalline copolymers.

The molecular architecture of the polymer backbone, (i.e., the manner in which the monomer units are connected in a polymer chain and their spatial isomery), the interaction between the polymer chains plus their arrangement and relationship to each other in space, will determine the physical properties of a given polymer and the class in which it will belong, that is, (1) non-crystalline, (2) crystallizable, (3) semicrystalline, or (4) crystalline.

The term "crystalline", as used herein, characterizes those polymers which possess high degrees of inter- and intra-molecular order, and which have a crystallinity content above 20 percent, as determined by X-ray analysis.

The term "semicrystalline", as used herein, characterizes those polymers which possess a lesser degree of inter- and intra-molecular order than in the crystalline polymers, and which have a crystallinity content ranging from about 4 to about 20 percent, as determined by X-ray analysis.

The term "crystallizable", as used herein, describes those polymers which are mainly amorphous in the undeformed state, but, upon stretching, orientation of the polymeric chains occurs with resulting crystallization.

The term "non-crystalline", or amorphous, as used herein, characterizes those polymers which do not have any crystallinity, determinable by X-ray analysis, in either the undeformed or elongated states.

In Belgian Pat. No. 577,819, crystalline copolymers with stereoblocks and a method for their preparation by the use of stereospecific Ziegler-type catalysts, namely, alpha-$TiCl_3$ and $Al(C_2H_5)_3$, are disclosed.

No known attempts have been made in the prior art to prepare polymeric materials in which the arrangement of the monomeric units along the polymeric backbone is such that crystallizable polymers with superior rubber-like properties are produced with the use of non-stereospecific catalysts.

The term "non-stereospecific catalyst", as used herein, means those ionic coordination complexes of the Ziegler-type which are capable of polymerizing alpha-olefins, particularly propylene, into homopolymers with atactic isomery, as compared to stereospecific catalysts which homopolymerize polypropylene to an isotactic or syndiotactic isomery.

Therefore, it is the object of this invention to produce crystallizable stereoblock copolymers having superior elastomeric properties.

It is a further object of this invention to produce crystallizable stereoblock copolymers consisting of (1) crystallizable copolymer or interpolymer blocks alternating with (2) amorphous non-crystallizable copolymer or interpolymer blocks, such stereoblock copolymers possessing superior rubber-like properties.

It is another object of this invention to produce crystallizable stereoblock copolymers consisting of (1) crystallizable homopolymer blocks alternating with (2) amorphous non-crystallizable copolymer or interpolymer blocks, such stereoblock copolymers possessing superior elastomeric properties.

Specifically, the novel crystallizable stereoblock rubbery copolymers of this invention may be illustrated by the following formulae representing the structures of the polymeric chains:

I. $[A_{a_1,b_1, etc.}] - [B_{Y_1}] - [A_{a_2,b_2, etc.}/X_2] - [B_{Y_2}]$ - etc.

II. $[A_{a_1,b_1, etc.}/X_1] - [A_{a_2,b_2, etc.}/X_2] - [A_{a_3,b_3, etc.}/X_3]$ - etc.

wherein,

A - is a copolymer or interpolymer block (i.e., a segment of the polymeric chain) derived from two or more dissimilar 1-olefin monomers;

$a_1, b_1 \ldots a_2, b_2 \ldots$ etc. - represents the number of each 1-olefin monomer a, b, $\ldots$ etc. making up each copolymer or interpolymer block A;

$X_1, X_2$ ... etc. - represents the total number of all the 1-olefin monomers making up each copolymer or interpolymer block A;

B - is a homopolymer block of an 1-olefin monomer;

$Y_1, Y_2$ . . . . etc. - represents the total number of 1-olefin monomers making up each homopolymer block B.

Other objects of the present invention will become apparent from the following description and the accompanying drawings wherein.

Figure 1:
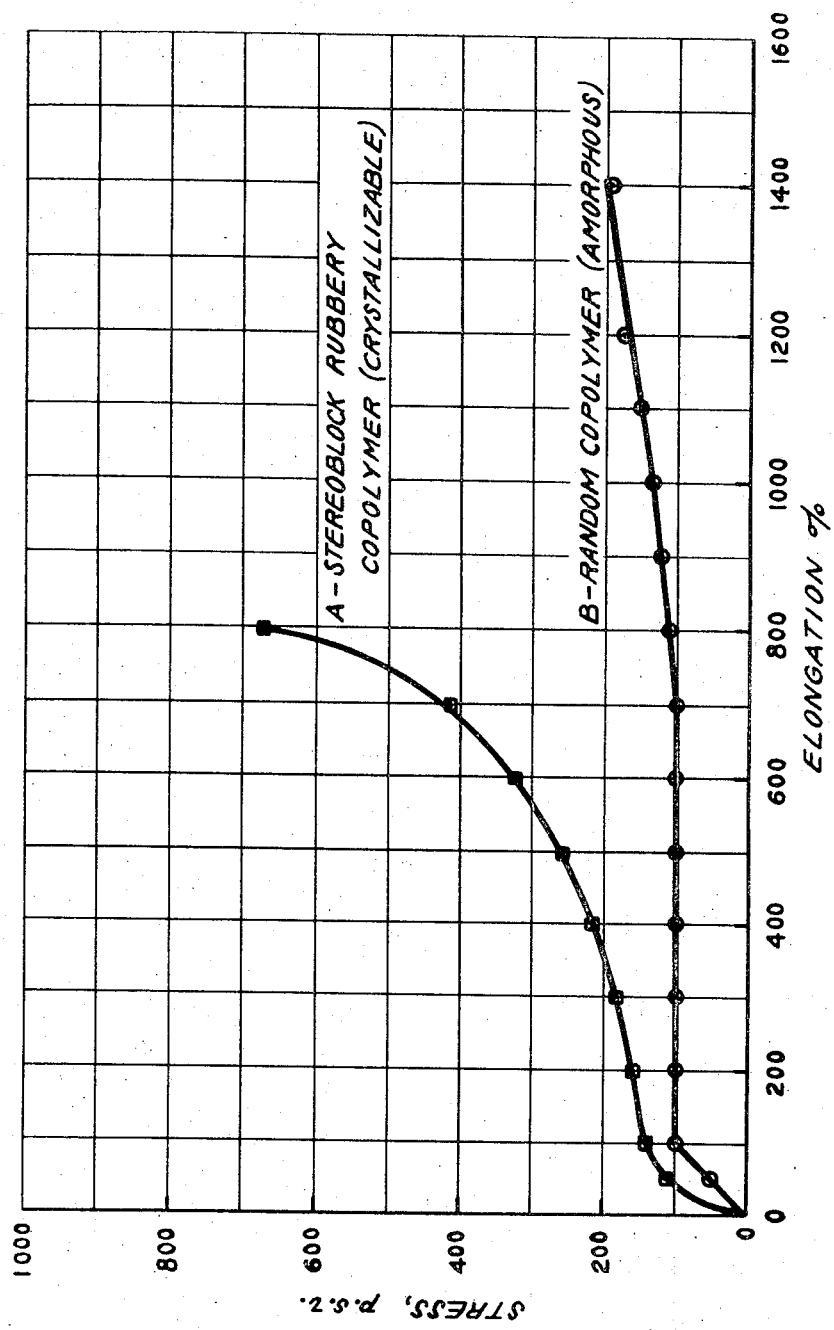
FIG. 1 is a diagram illustrating the stress-strain characteristics of the stereoblock copolymers of this invention in comparison with amorphous copolymers having a random distribution of monomers along the polymeric chain.
Figure 2:
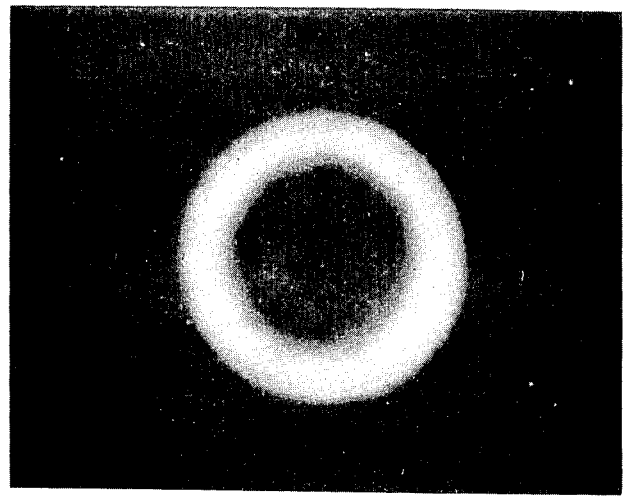
FIG. 2 is an X-ray transmission film of the random ethylene-propylene copolymer prepared in Example 14 said copolymer being in the undeformed state.
Figure 3:
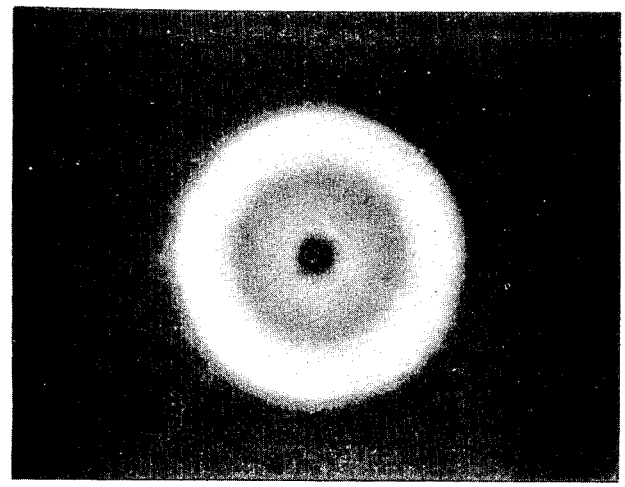
FIG. 3 is an X-ray transmission film of the same random copolymer of FIG. 2, said copolymer being in a stretched condition of 400 percent elongation.
Figure 4:
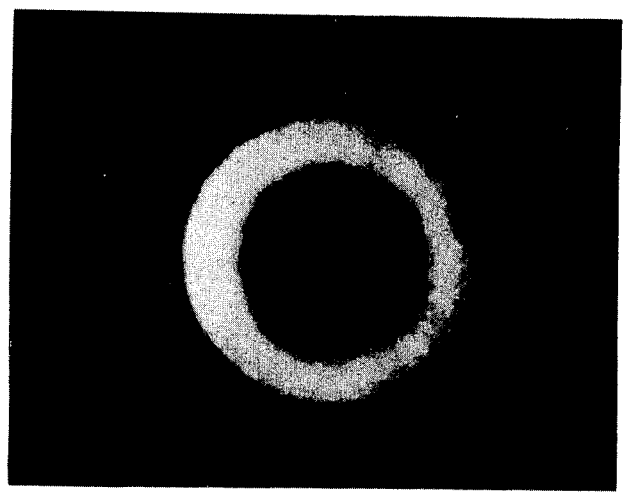
FIG. 4 is an X-ray transmission film of the crystallizable stereoblock rubbery copolymer prepared in Example 1, said stereoblock copolymer being in the undeformed state.
Figure 5:
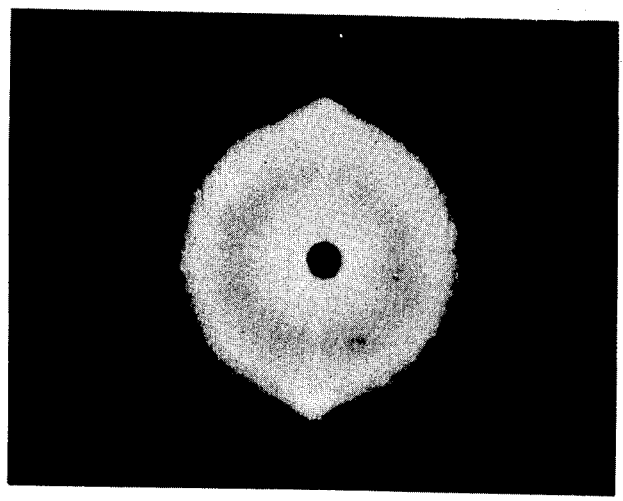
FIG. 5 is an X-ray transmission film of the same stereoblock copolymer of FIG. 4, said copolymer being in a stretched condition of 300 percent elongation.
Figure 6:
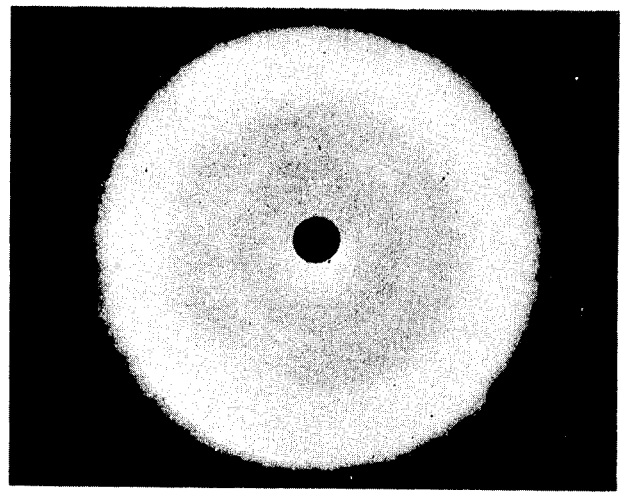
FIG. 6 is an X-ray transmission film of the crystallizable stereoblock rubbery copolymer prepared in Example 9, said stereoblock copolymers being in the undeformed state.
Figure 7:
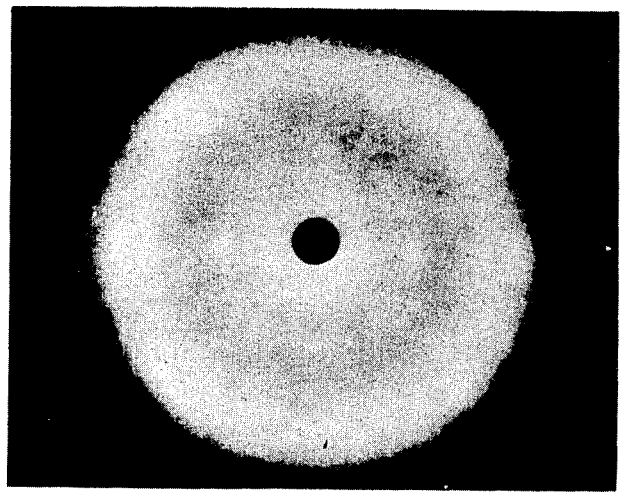
FIG. 7 is an X-ray transmission film of the same stereoblock copolymer of FIG. 6, said copolymer being in a stretched condition of 500 percent elongation.

According to this invention, 1-olefins are polymerized to form crystallizable stereoblock copolymers of the above structures with tailor-made elastomeric properties. Upon the particular monomers used, the particular molar composition of the copolymer or interpolymer blocks A, the length of the blocks A and B, and the non-stereospecific catalyst used, depend the physical and mechanical properties of the stereoblock copolymeric products that are obtained, as is more fully explained below.

Specific 1-olefin monomers which are useful in forming the homopolymer blocks B include (1) straight-chain 1-olefins, such as ethylene, propylene, butene-1, pentene-1, hexene-1, etc., and (2) branched-chain 1-olefins having one or more alkyl substituents branched on the chain, such as 3-methyl-butene-1, 4-methyl-pentene-1, 4-methyl-hexene-1, 5-methyl-hexene-1, 4,5-dimethyl-hexene-1, 4-methyl-5-ethyl-hexene-1, 3-methyl-6-propyl-heptene-1, etc. The preferred monomers are straight-chain or branched-chain 1-olefins having no more than a total of 12 carbon atoms.

The copolymer or interpolymer blocks A are obtained by polymerizing two or more dissimilar 1-olefin monomers. Any of the 1-olefin monomers used in forming the homopolymer blocks B may be used in forming the copolymer or interpolymer blocks A. The preferred monomers for use in the copolymer blocks A are also straight-chain or branched-chain 1-olefins having no more than a total of 12 carbon atoms. It is not necessary to use the same 1-olefin that is used for the homopolymer blocks B in making the copolymer or interpolymer blocks A. Thus the block A may be a copolymer of two dissimilar 1-olefins or an interpolymer of three or more dissimilar 1-olefins, none of which need be the 1-olefin used for the homopolymer block B.

In the stereoblock copolymers represented by the structure shown in formula I above, the homopolymer blocks B may consist of (1) the same 1-olefin, or (2) different 1-olefins along the same stereoblock polymeric chain. Likewise, the copolymer or interpolymer blocks A of formula I may consist of (1) the same molar ratios of the same 1-olefin monomers, or (2) different molar ratios of the same 1-olefin monomers or (3) dissimilar monomers completely, throughout the stereoblock polymeric chain; whereas, in formula II, the copolymer or interpolymer blocks A must consist of either (1) different molar ratios of the same 1-olefins, or (2) dissimilar monomers completely. If the percent molar compositions of the monomers making up all the copolymer blocks A in formula II were substantially the same, the result would be a copolymer with randomly distributed monomers along the polymeric chain without the crystallizable characteristic which is necessary for this invention.

The length of the different copolymer or interpolymer blocks A and homopolymer blocks B may be either equal (i.e., $X_1 = X_2 = X_3 =$ etc., and $Y_1 = Y_2 = Y_3 =$ etc.) or unequal (i.e., $X_1 \neq X_2 \neq X_3 \neq$ etc., and $Y_1 \neq Y_2 \neq Y_3 \neq$ etc.). Further, the minimum number of alternating blocks in structures represented by formula I above has been found to be three for the purposes of this invention, whereas, the minimum number of alternating copolymer blocks A in structures of the formula II type has been found to be two. It is preferred, however, that the total number of alternating blocks in both structures be from seven to 13. There is no critical limit, save for practicality, as to the maximum number of blocks that may be used for either structure.

It is preferred, but not necessary, to limit the composition of the copolymer block A in structures represented by formula I to the participation of two dissimilar 1-olefins, and to limit the preparation of the homopolymer block B to one of the two monomers used in the preparation of the copolymer block A. It is also preferred to limit the steric isomerism of the 1-olefins higher than ethylene, participating in the homopolymer and copolymer blocks, to one kind, that is, mainly if not wholly atactic.

The crystallizable stereoblock copolymers of this invention are amorphous in the unstretched condition but crystallize upon stretching, thereby exhibiting superior rubber-like properties, in contrast to random copolymers which are amorphous under all conditions. The stereoblock copolymeric chains become aligned and oriented upon stretching, due to the presence of crystallizable homopolymer blocks B as in formula I, or crystallizable copolymer blocks A as in formula II. There is not sufficient molecular order for crystallization, however, in the undeformed state.

Illustrating this invention, ethylene-higher 1-olefin copolymer blocks A may be combined with ethylene homopolymer blocks B to form a crystallizable stereoblock rubbery copolymer of the formula I type. The average number of ethylene monomer units in any one homopolymer block B should be greater than 20 and the maximum number should be of the order of 200, that is, Y = 20 to 200. The total number of ethylene and higher 1-olefin units in any copolymer block A should be greater than 100 and the maximum number should be of the order of 2000, that is, X = 100–2000. The ratio of ethylene to higher 1-olefin in the copolymer block A may vary from about 20:80 to 80:20.

If another 1-olefin replaces ethylene for the formation of the homopolymer block B, the length of the homopolymer block may be correspondingly increased. For example, in a homopolymer block of polypropylene, the number of propylene monomer units should be increased to the order of from about 200 to about 1000 units, although the length of the alternative copolymer blocks A may remain in the order of 100–2000 total monomer units.

In a stereoblock copolymer of the formula II type, with alternating amorphous and crystallizable copolymer blocks A of ethylene and higher 1-olefins, the total number of ethylene and higher 1-olefin units in any one copolymer block should be in the order of 100 to 2000. The ratio of ethylene to higher 1-olefin in the amorphous copolymer block may vary from about 20:80 to 80:20, whereas the ratio of ethylene to higher 1-olefin in the crystallizable copolymer block should be at the extremes or outside the limits of the aforementioned ratio, that is, the ratio of ethylene to higher 1-olefin should be about 5:95 to 20:80, or 80:20 to 95:5.

Obvious extensions of the above concepts will be apparent to one skilled in the art, and an infinite number of copolymer and interpolymer combinations are possible, depending on the selection of 1-olefins for the homopolymer and copolymer blocks, the number of blocks along the stereoblock copolymer chain, the length of any one block, the percent molar composition in the copolymer block, and certain process variables which are more fully explained below. For example, it is contemplated that with copolymer blocks of two or more dissimilar 1-olefins higher than ethylene, the molar ratios of the monomers and the total number of monomers may be different than those given above for the copolymer blocks wherein one of the monomers is ethylene.

Several methods of block polymerization may be used to obtain the novel crystallizable stereoblock rubbery copolymers of this invention. An illustrative method involves polymerizing an 1-olefin to form a homopolymer block B, then introducing a mixture of two or more dissimilar 1-olefin monomers to form a copolymer block A, and then alternately forming further homopolymer and copolymer blocks by separate introduction of the polymerizable monomers. A polymeric chain composed of different blocks of homopolymers and copolymers may thus be synthesized. Block polymerization of this type is based on the discovery that complexes between the ionic coordination catalysts of the type described above, and the growing polymer chain remain active for a significant period of time, i.e. these catalysts have the ability to maintain the growing polymer chain in a polymerizable condition for a considerable period of time. Since the ionic coordination type catalysts maintain the growing molecule in a polymerizable condition, this permits separate introduction of various polymerizable monomers and the sequential formation of blocks of homopolymers and copolymers.

In conducting polymerizations by this method, it is possible to remove all unreacted monomers in the polymerization system before polymerization of an additional monomer or monomers either by a vacuum technique or by purging the polymerization system with an inert gas such as nitrogen. By these techniques it is possible to obtain distinct blocks which are uncontaminated by the monomer used in forming a previous block. However, in most cases it is not necessary to obtain blocks of this purity, and it is merely sufficient to add the new monomer without removal of any unreacted monomers used in the preparation of a previous block. Additionally, if a common 1-olefin is used in forming both the homopolymer block and the copolymer blocks, there is usually no necessity to remove any unreacted common 1-olefin from the polymerization system prior to the formation of the next successive block. In such cases, after polymerization of one monomer to form the homopolymer block B, the second polymerizable monomer may simply be added so that the former common 1-olefin monomer may be continuously introduced into the polymerization system.

The non-stereospecific catalysts which may be used in the polymerization of the crystallizable stereoblock rubbery copolymers of this invention include the ionic-coordination type catalysts containing a transition metal and organometallic bonds, which are capable of polymerizing alpha-olefins to form atactic polymers. This class of catalysts is well known in the art and includes mixtures of vanadium oxytrihalide with either aluminum trialkyl, alkyl aluminum dihalide or dialkyl aluminum halide; mixtures of titanium tetrahalide with lithium aluminum tetraalkyl and with both lithium alkyl and aluminum trialkyl; mixtures of titanium tetrahalide with either aluminum trialkyl, alkyl aluminum diahalide, or dialkyl aluminum halide. Specific examples of catalysts which are suitable for this invention include mixtures of vanadium oxytrichloride with the following: triethyl aluminum, tripropyl aluminum, tributyl aluminum, triisobutyl aluminum, triphenyl aluminum, trihexyl aluminum, triheptyl aluminum, tridodecyl aluminum, ethyl aluminum dichloride, propyl aluminum dichloride, butyl aluminum dichloride, phenyl aluminum dichloride, diethyl aluminum chloride, dipropyl aluminum chloride and dibutyl aluminum chloride; mixtures of titanium tetrachloride with analogous aluminum compounds described above; mixtures of titanium tetrachloride with lithium aluminum tetraethyl, lithium aluminum tetrapropyl, lithium aluminum tetraheptyl and lithium butyl-aluminum triisobutyl.

The concentration of the catalyst in the polymerization system may be about 0.001 to about 0.1 mole of catalyst per liter of solvent. However, it is preferred to use from about 0.002 to about 0.02 mole per liter of solvent. The catalyst concentration will vary with the specific catalyst and the particular monomers used in the polymerization reaction, and in some cases, amounts of catalysts above and below the indicated ranges may be desirable.

The polymerization reaction is usually carried out in an inert hydrocarbon solvent medium. The particular solvent used in some cases is selected on the basis of its boiling point, for example, where it is necessary to employ a high temperature in the polymerization reaction, it is desirable to have a solvent with a boiling point above the temperature of the polymerization reaction. Generally, it has been found that such common solvents as benzene, toluene, xylene, hexane, heptane, octane and other hydrocarbon solvents may be used in the reaction.

The temperature of the polymerization reaction will depend on the particular monomers that are being polymerized, the rates of reaction of these monomers, the boiling point of the solvent system, and the desired length of the blocks in the stereoblock copolymer. Due to the fact that the rates of reaction of different polymerizable monomers vary with the temperature, the temperature of polymerization will have an effect on the size of the block. In each case it is desirable to predetermine the exact temperature at which several monomers can be polymerized to give a particular type of stereoblock copolymer. Generally, however, it has been found that stereoblock copolymers can be produced in a temperature range of from about 0°C. to about 100°C. It is preferred to carry out the polymerization in the temperature range of from about 20°C. to about 35°C.

The polymerization reaction may be carried out at various pressures, although in most cases it is sufficient to polymerize the monomers at atmospheric pressure. However, the pressure limits for the polymerization procedure can vary from almost zero up to 100 psi, and in some cases it may be desirable to use either elevated or reduced pressures in order to decrease or increase the reaction time, or produce particular types of stereoblock copolymers.

Extraction studies in boiling n-heptane, X-ray defraction patterns and the stress-strain characteristics of the crystallizable stereoblock rubbery copolymers, obtained by employing the above-mentioned polymerization techniques, prove that these are true copolymers and illustrate the unique structures of this invention and their entirely different behavior from copolymers having a random distribution of monomers along the polymeric chain, homopolymers of 1-olefins, and physical mixtures of such homopolymers.

In a physical mixture of polyethylene and polypropylene homopolymers consisting, for example, of 50 parts of polyethylene, and 50 parts of polypropylene by weight, the extractable portion in boiling n-heptane for 48 hours is 44 percent, proportional to 2 percent and 87 percent extractable portions of polyethylene and polypropylene respectively. With the stereoblock copolymers described in this invention, the percent extractable portion is above 89, as shown in the following table.

residue is almost the same as the original composition of the copolymer under extraction, whereas, with a 50/50 by weight physical mixture of polyethylene and polypropylene homopolymers, the extract contained more than 95 percent polypropylene and the residue contained more than 85 percent polyethylene. The results of these extraction studies illustrate that the stereoblock copolymers of this invention are true copolymers rather than physical mixtures of homopolymers.

A crystallizable stereoblock rubbery copolymer of this invention, having the same average composition as a copolymer with a random distribution of the monomer units along the polymeric chain, shows an entirely different stress-strain behavior than the latter. In FIG. 1, there is illustrated the stress-elongation plot of the stereoblock copolymer prepared in Example 7 (Curve A) and of the random ethylene-propylene copolymer prepared in Example 14 (Curve B), each copolymer being uncured and with the same average ratio of ethylene to propylene, about, 50/50 by weight, and with about the same intrinsic viscosity (3.6 in tetralin at 135°C.). The random copolymer behaves in the typical fashion of non-crystallizable, amorphous rubbers, for example, synthetic SBR-rubbers, which behavior is characterized by very high degrees of elongation at the point of rupture and low and constant stress values with increasing percent of elongation. Stereoblock copolymers behave like other known crystallizable rubbers, for example, natural rubber, which behavior is characterized by a high tensile strength at the point of rupture and a rather sudden increase in stress at a certain degree of elongation, above 500 percent. This difference in behavior is due to the difference in the microstructure of the two copolymers. Upon stretching a stereoblock copolymer, containing, for example, alternating polyethylene homopolymer blocks and ethylene-propylene copolymer blocks, the polyethylene blocks align and orient themselves parallel to the direction of stretching and consequently, crystallinity is induced resulting in a high tensile strength. In comparison, random copolymers do not have these microstructural characteristics necessary for alignment and crystallization upon stretching.

Another very interesting difference between the stereoblock copolymers of this invention and random copolymers is observed by examining X-ray transmission films of the copolymers. A random copolymer produces the same kind of X-ray transmission pattern, both in the unstretched (FIG. II) and stretched (FIG.

Extraction Data With Boiling N-Heptane

| Example | Structure of Polymer | E/P Ratio in Weight | Soluble (%) |
|---|---|---|---|
|  | Polyethylene (E) | 100/0 | 2 |
|  | Polypropylene (P) | 0/100 | 87 |
|  | Physical Mixture (E & P) | 50/50 | 44 |
| 1 | EP-E-EP-E-EP-E-EP | 50/50 | 95 |
| 3 | EP-P-EP-P-EP-P-EP | 48/52 | 96 |
| 7 | EP-($N_2$)-E-EP-($N_2$)-E ... etc. | 48/52 | 97 |
| 8 | EP-(Vac)-E-(Vac)-EP-(Vac) ... etc. | 55/45 | 89 |

Another important difference between the stereoblock copolymers of the present invention and a physical mixture of homopolymers is shown by the percent composition of the extract and the extraction residue by boiling n-heptane. In the case of the crystallizable stereoblock rubbery copolymers of this invention, the percent composition of the extract and the extraction III) condition, which are characterized by one or more broad difuse halos. As shown in FIGS. IV and VI, unstretched, crystallizable stereoblock copolymers produce X-ray transmission patterns similar to those of the random type copolymers.

On the other hand, stretched samples of crystallizable stereoblock copolymers produce X-ray transmission patterns consisting of an array of discrete spots or arcs superimposed upon an amorphous pattern of one or more difuse halos, as shown in FIGS. V and VII. The discrete spots or arcs are due to the orientation and crystallization of the homopolymer blocks. Depending on the 1-olefin used for the preparation of these homopolymer blocks, different X-ray transmission pattersn are obtained by the stretched samples. Compare for example, FIG. V, wherein the homopolymer blocks are composed of polyethylene, with FIG. VII, wherein the homopolymer blocks are composed of polybutene. These observations of X-ray transmission films constitute additional proof supporting the proposed microstructure of crystallizable stereoblock copolymers.

The stereoblock copolymers of this invention may be compounded and vulcanized similarly to other elastomeric compounds obtained from copolymers of alpha-olefins. They may thus be vulcanized with conventional vulcanizing ingredients such as sulphur, dicumyl peroxide, and the like, and may also be compounded with such conventional fillers as carbon black, silica, aluminum silicate and other inorganic fillers, and with pigments and various plasticizers.

A preferred procedure for producing a vulcanizate used in this invention is as follows: in a laboratory mill whose cylinders, 12 × 6 inches, were temperature-controlled at 300°F., 100 parts of a crystallizable stereoblock rubbery copolymer were mixed with 50 parts of Philblack 0, for 12–15 minutes. The temperature of the cylinders was then reduced to 150°F., and to the previous mixture were added three parts Dicup-95R (95% dicumyl peroxide) and one part sulphur for a second mixing operation of 12–15 minutes. The mixed product was then vulcanized in a press of parallel plates maintained at 325°F. Vulcanization generally takes 30 minutes at a pressure of 500–750 psi. A rubbery sheet having a thickness of about 80 mil was obtained. ASTM dumbbells were cut from this sheet for the measurement of the stress-elongation tests reported in Table IX below for several of the following examples.

On the basis of the physical and mechanical properties of the crystallizable stereoblock rubbery copolymers of this invention, and their ability to be reinforced and vulcanized, it is evident that they are useful for the preparation of tire treads and sidewalls as well as in general mechanical rubber articles, such as hose, belting, etc.

Numerous other methods and conditions of polymerization will suggest themselves to those skilled in the art. The following examples are therefore included to illustrate, but are not intended to limit, the scope of the invention as hereinafter claimed.

EXAMPLE 1.

This example illustrates a method of preparing a crystallizable stereoblock rubbery copolymer of alternating amorphous ethylene-propylene copolymer blocks (E-P) and crystallizable polyethylene homopolymer blocks (E), the latter being of unequal length throughout the polymeric chain.

A catalyst consisting of 0.0144 mole of $LiAl(C_7H_{15})_4$ dissolved in approximately 23 ml. of toluene and 0.0144 mole of $TiCl_4$ was added to 1800 ml. of dried and purified heptane in a three-neck flask equipped with thermometer and stirrer under an atmosphere of purified nitrogen. Polymerization was carried out at a temperature of 25–35°C. by introducing the monomers into the flask below the surface of the catalyst solution. Formation of the alternating building blocks was carried out in the following order and is illustrated below in Table I.

1. Copolymerization of a 50/50 molar mixture of ethylene-propylene for 2 minutes.
2. Propylene feed stopped; polymerization of ethylene alone for 2 minutes.
3. Introduction of propylene and copolymerization of a 50/50 molar mixture for 4 minutes.
4. Polymerization of ethylene alone for 3 minutes.
5. Introduction of propylene and copolymerization of a 50/50 molar mixture for 5 minutes.
6. Polymerization of ethylene alone for 4 minutes.
7. Introduction of propylene and copolymerization of a 50/50 molar mixture for 20 minutes.

The above polymerization steps can be represented in tabular form as follows:

TABLE I

| Block Sequence | Copolymer Block | Homopolymer Block | Molar Ratio of Feed | Feed Rate of Monomers (ml./min.) | Feed Time (mins.) |
|---|---|---|---|---|---|
| 1 | E-P | | 50–50 | 750–750 | 2 |
| 2 | | E | 100 | 750 | 2 |
| 3 | E-P | | 50–50 | 750–750 | 4 |
| 4 | | E | 100 | 750 | 3 |
| 5 | E-P | | 50–50 | 750–750 | 5 |
| 6 | | E | 100 | 750 | 4 |
| 7 | E-P | | 50–50 | 750–750 | 20 |

After the above polymerization sequence, a very viscous reaction mixture was obtained, from which the product was isolated by pouring the mixture into an equal volume of a methanol-isopropanol mixture (50—50, by weight) containing a small amount (0.5 percent by weight of copolymer) of phenyl-beta-naphthyl amine as anti-oxidant. A solid precipitate of rubbery material was obtained which was then washed with an additional amount of the same 50—50 methanol-isopropanol mixture in a Waring Blender. After drying at room temperature for 24 hours, 60 grams of crystallizable stereoblock rubbery copolymer was obtained. The physical and mechanical properties of this copolymer are tabulated below in Table IX.

EXAMPLE 2.

This example illustrates a crystallizable stereoblock rubbery copolymer of alternating amorphous, ethylene-propylene copolymer blocks (E-P) and crystallizable polyethylene homopolymer blocks (E), wherein the latter are of equal length throughout the polymeric chain. The same catalytic system and conditions were employed as described in Example 1, and the polymerization steps were carried out according to the order shown in Table II.

Table II

| Block Sequence | Copolymer Block | Homopolymer Block | Molar Ratio of Feed | Feed Rate of Monomers (ml./min.) | Feed Time (mins.) |
|---|---|---|---|---|---|
| 1 | E-P | | 50–50 | 750–750 | 3 |
| 2 | | E | 100 | 750 | 2 |
| 3 | E-P | | 50–50 | 750–750 | 2 |
| 4 | | E | 100 | 750 | 2 |
| 5 | E-P | | 50–50 | 750–750 | 2 |
| 6 | | E | 100 | 750 | 2 |
| 7 | E-P | | 50–50 | 750–750 | 10 |
| 8 | | E | 100 | 750 | 2 |
| 9 | E-P | | 50–50 | 750–750 | 2 |
| 10 | | E | 100 | 750 | 2 |
| 11 | E-P | | 50–50 | 750–750 | 30 |

Seventy-two grams of crystallizable stereoblock rubbery copolymer obtained from the above polymerization sequences was isolated as described in Example 1. The physical and mechanical properties of this copolymer are tabulated below in Table IX. The stereoblock copolymer obtained from this example had a more uniform distribution of homopolymer and copolymer blocks, as regards length, along the polymeric chain than was obtained in the previous example. As a result, this stereoblock copolymer had a greater elongation at the point of rupture, but lower tensile strength then the stereoblock copolymer of Example 1, which had irregular length of alternating blocks along the polymeric chain and longer homopolymer blocks.

EXAMPLE 3.

This example illustrates a crystallizable stereoblock rubbery copolymer of alternating amorphous, ethylene-propylene copolymer blocks (E-P) and crystallizable, polypropylene homopolymer blocks (P). The same catalytic system and conditions were employed as described in Example 1, and the polymerization steps were carried out according to the order shown in Table III.

Table III

| Block Sequence | Copolymer Block | Homopolymer Block | Molar Ratio of Feed | Feed Rate of Monomers (ml./min.) | Feed Time (mins.) |
|---|---|---|---|---|---|
| 1 | E-P | | 65–35 | 1050–580 | 3 |
| 2 | | P | 100 | 975 | 3 |
| 3 | E-P | | 65–35 | 1050–580 | 4 |
| 4 | | P | 100 | 975 | 4 |
| 5 | E-P | | 65–35 | 1050–580 | 6 |
| 6 | | P | 100 | 975 | 5 |
| 7 | E-P | | 65–35 | 1050–580 | 15 |

The 82 grams of crystallizable stereoblock rubbery copolymer that was obtained from the above polymerization sequence was isolated as described in Example 1. The physical and mechanical properties of this copolymer are tabulated below in Table IX. X-ray analysis as well as the stress-elongation properties of the uncured copolymer indicate that the polypropylene homopolymer blocks did not crystallize as readily as did the polyethylene blocks of the previous examples; because the stereospecific isomery of the polypropylene homopolymer blocks was of an atactic nature. The elastomeric properties of the vulcanized copolymer are still excellent, as shown in Table IX.

EXAMPLE 4.

A crystallizable stereoblock rubbery copolymer with alternating ethylene-propylene copolymer blocks (E-P), polyethylene homopolymer blocks (E) and polypropylene homopolymer blocks (P) was prepared, using the same catalytic system and conditions as described in Example 1. The polymerization steps were carried out according to the order shown in Table IV.

Table IV

| Block Sequence | Copolymer Block | Homopolymer Block | Molar Ratio of Feed | Feed Rate of Monomers (ml./min.) | Feed Time (mins.) |
|---|---|---|---|---|---|
| 1 | E-P | | 50–50 | 1000–1000 | 3 |
| 2 | | E | 100 | 1100 | 2 |
| 3 | E-P | | 50–50 | 1000–1000 | 4 |
| 4 | | P | 100 | 1125 | 2 |
| 5 | E-P | | 50–50 | 1000–1000 | 4 |
| 6 | | E | 100 | 1100 | 2 |
| 7 | E-P | | 50–50 | 1000–1000 | 4 |
| 8 | | P | 100 | 1125 | 2 |
| 9 | E-P | | 50–50 | 1000–1000 | 4 |
| 10 | | E | 100 | 1100 | 3 |
| 11 | E-P | | 50–50 | 1000–1000 | 4 |
| 12 | | P | 100 | 1125 | 3 |
| 13 | E-P | | 50–50 | 1000–1000 | 4 |

Ninety-five grams of crystallizable stereoblock rubbery copolymer was isolated by the process described in Example 1. The elastomeric properties of this stereoblock copolymer, as shown in Table IX, were intermediate between those stereoblock copolymers having ethylene-propylene copolymer blocks with only polyethylene homopolymer blocks and those with only polypropylene homopolymer blocks.

EXAMPLE 5.

The polymerization procedure and steps outlined in Example 2 were repeated using a different catalyst system. To 1800 ml. of heptane solvent were added 0.008 moles of $VOCL_3$ and 0.020 mole of $Al(C_{12}H_{25})_3$ as the polymerization catalyst. Seventy grams of crystallizable stereoblock rubbery copolymer were obtained. The properties of this stereoblock copolymer are tabulated in Table IX.

This example shows that elastomeric stereoblock copolymers can be prepared by various Ziegler-type catalysts which will copolymerize two dissimilar 1-olefins and homopolymerize 1-olefins into an atactic steric isomerism.

EXAMPLE 6.

A crystallizable stereoblock rubbery copolymer was prepared from alternating blocks of amorphous ethylene-propylene copolymer and crystallizable ethylene-propylene copolymer.

Using the same catalytic system and conditions as described in Example 1, the polymerization of ethylene and propylene was carried out according to the following procedure. Ethylene monomer was introduced throughout the polymerization reaction at a constant feed rate of 750 ml./min., while the feed rate of propylene monomer was varied from 750 ml./min. to 50 ml./min. according to the following sequence:

| Feed-Time | Propylene Feed (ml./mins.) |
|---|---|
| 1–4 mins. | 750 |
| 5–8 do. | 50 |
| 9–12 do. | 750 |
| 13–16 do. | 50 |
| 17–20 do. | 750 |
| 21–24 do. | 50 |
| 25–28 do. | 250 |
| 29–32 do. | 50 |
| 33–36 do. | 250 |
| 37–40 do. | 50 |

After a total polymerization time of 40 minutes, the stereoblock copolymer was isolated as in Example 1. Seventy grams of copolymer were obtained whose properties are tabulated in Table IX.

EXAMPLE 7.

This example illustrates a method of preparing a stereoblock copolymer composed of alternating amorphous, ethylene-propylene copolymer blocks (E-P) and crystallizable, polyethylene homopolymer blocks (E) wherein any unreacted and dissolved propylene was expelled from the system prior to the formation of absolutely pure polyethylene homopolymer blocks. The same catalytic system and conditions were employed as described in Example 1, with the only difference being that nitrogen gas was purged through the reaction mixture at a rate of 2 liters/min. for a 3-minute period following each copolymerization step of ethylene and propylene.

Seventy grams of crystallizable stereoblock rubbery copolymer was isolated according to the procedure of Example 1. The properties of this copolymer are shown in Table IX.

EXAMPLE 8.

This example illustrates another modification of the procedure which may be used in preparing the crystallizable stereoblock rubbery copolymers of this invention. Example 1 was repeated, the only difference being that a vacuum of 23 ins. Hg was used for 4 minutes after each copolymerization and homopolymerization step for the removal of unreacted monomers from the polymerization system. Sixty-six grams of stereoblock copolymer were isolated, whose properties are tabulated below in Table IX. The purpose of this example was to illustrate a method of preparing a stereoblock copolymer with pure copolymer and homopolymer blocks.

EXAMPLE 9.

This example illustrates a crystallizable stereoblock rubbery copolymer of alternating amorphous, ethylene-butene-1 copolymer blocks (E-B) and crystallizable polybutene-1 homopolymer blocks (B). The same catalyst system and conditions were employed as described in Example 1 except that Skelley-B Solvent (Marketed by the Skelly Oil Co.), a mixture of alkanes with a boiling range of 60°–70°C., was used as the solvent, and the polymerization steps were carried out according to the order shown in Table V.

Table V

| Block Sequence | Copolymer Block | Homopolymer Block | Molar Ratio of Feed | Feed Rate of Monomers (ml./min.) | Feed Time (mins.) |
|---|---|---|---|---|---|
| 1 |  | B | 100 | 1500 | 4 |
| 2 | E-B |  | 40–60 | 800–1280 | 6 |
| 3 |  | B | 100 | 1500 | 4 |
| 4 | E-B |  | 40–60 | 800–1280 | 6 |
| 5 |  | B | 100 | 1500 | 4 |
| 6 | E-B |  | 40–60 | 800–1280 | 6 |
| 7 |  | B | 100 | 1500 | 4 |
| 8 | E-B |  | 40–60 | 800–1280 | 6 |
| 9 |  | B | 100 | 1500 | 10 |

According to this invention, stereoblock copolymers may be prepared with (1) copolymer blocks at either end of the chain, (2) homopolymer blocks at either end of the chain, or (3) a copolymer block at one end and a homopolymer block at the other.

In this particular example, a crystallizable stereoblock rubbery copolymer was prepared having homopolymer blocks at the beginning and end of the stereoblock copolymer chain. Ninety grams were isolated according to the procedure outlined in Example 1. The properties of this copolymer are tabulated below in Table IX.

EXAMPLE 10.

This example illustrates a crystallizable stereoblock rubbery copolymer wherein the amorphous copolymer block is made from two dissimilar 1-olefins, neither of which is used to make the crystallizable homopolymer block. A catalyst consisting of 0.016 moles each of $TiCl_4$, $Al(i-Butyl)_3$, and LiButyl was added to 2000 ml. of dried and purified Skelley-B Solvent in a three-neck flask equipped with thermometer and stirrer under an atmosphere of purified nitrogen. Copolymerization of ethylene and propylene monomers was first carried out by introducing the monomers into the flask below the surface of the catalyst solution for a certain period of time. The formation of a homopolymer block of butene-1 then followed. In alternate fashion thereafter, copolymer blocks of ethylene-propylene (E-P), with homopolymer blocks of butene-1 (B), were used as building blocks for the resulting stereoblock copolymer.

The polymerization temperature was maintained at 25–35°C. Vacuum of 23 in. Hg. was used for 4 minutes after the formation of each copolymer and homopolymer block for the removal of any unreacted and dissolved monomers. The polymerization steps were carried out according to the steps shown in Table VI.

Table VI

| Block Sequence | Copolymer Block | Homopolymer Block | Molar Ratio of Feed | Feed Rate of Monomers (ml./min.) | Feed Time (mins.) |
|---|---|---|---|---|---|
| 1 | E-P | | 50–50 | 750–750 | 3 |
| 2 | | B | 100 | 1500 | 10 |
| 3 | E-P | | 50–50 | 750–750 | 5 |
| 4 | | B | 100 | 1500 | 10 |
| 5 | E-P | | 50–50 | 750–750 | 6 |
| 6 | | B | 100 | 1500 | 10 |
| 7 | E-P | | 50–50 | 750–750 | 15 |

Sixty-two grams of crystallizable stereoblock rubbery copolymer were isolated according to the procedure described in Example 1. The properties of this stereoblock copolymer are tabulated below in Table IX.

EXAMPLE 11.

In this example, a crystallizable stereoblock rubbery copolymer was prepared having alternating amorphous copolymer blocks of propylene-dodecene-1 (P-D) and crystallizable homopolymer polydodecene-1 blocks (D). A catalyst consisting of 0.0144 mole of $LiAl(C_7H_{15})_4$ dissolved in approximately 23 ml. of toluene and 0.0144 mole of $TiCl_4$ was added to 1800 ml. of dried and purified heptane in a three-neck flask equipped with thermometer and stirrer under an atmosphere of purified nitrogen. Four hundred grams of liquid dodecene-1 were introduced into the polymerization flask containing the solvent and catalyst, and propylene gas was simultaneously introduced at a rate of 1,000 ml./min. for 5 minutes to form the first copolymer block P-D. The propylene feed was then stopped for 4 hours to form the first homopolymer block of poly dodecene-1.

Thereafter, the propylene gas was fed into the flask for periods of 5 minutes and shut off for periods of 4 hours for a total polymerization time of about 24 hours. The polymerization was carried out at temperature of 25°–35°C. and the polymerization steps may be represented as follows:

$[P-D]_{5\ mins.} - [D]_{4\ hours} - [P-D]_{5\ mins.} - [D]_{4\ hours} - [P-D]_{5\ mins.} - [D]_{4\ hours} - [P-D]_{5\ mins.} - [D]_{4\ hours} - [P-D]_{5\ mins.} - [D]_{8\ hours}.$ Forty grams of crystallizable stereoblock rubbery copolymer was isolated according to the procedure outlined in Example 1. The properties of this copolymer are tabulated below in Table IX.

EXAMPLE 12.

A crystallizable stereoblock rubbery copolymer was prepared with alternating blocks of amorphous ethylene-propylene copolymer (E-P) and crystallizable polyethylene homopolymer (E) using a "soluble" catalyst. The purpose of this example is to show that catalysts other than the fairly insoluble heterogeneous catalysts, exemplified by (1) $TiCl_4$ and $LiAlR_4$ (2) $VOCl_3$ and $AlR_3$, (3) $TiCl_4$, LiR and $AlR_3$, and the like, wherein R is an alkyl group, may be used for the preparation of the crystallizable stereoblock rubbery copolymers of this invention. The particular catalyst used for this example was $VOCl_3$ and $AlCl_2R$ which belongs to the class of soluble catalysts due to their greater solubility in the solvents used for these polymerizations.

A catalyst consisting of 0.002 mole of $VOCl_3$ and 0.030 mole of $AlCl_2(C_2H_5)$, was added to 2000 ml. of dried and purified heptane in a three-neck flask equipped with thermometer and stirrer under an atmosphere of purified nitrogen. The technique of polymerization was similar to the previous examples. The polymerization reaction was carried out at a temperature of 25°–30°C. and the polymerization steps were carried out according to the order described in Table VII.

TABLE VII

| Block Sequence | Copolymer Block | Homopolymer Block | Molar Ratio of Feed | Feed Rate of Monomers (ml./min.) | Feed Time (mins.) |
|---|---|---|---|---|---|
| 1 | E-P | | 35–65 | 525–975 | 6 |
| 2 | | E | 100 | 975 | 3 |
| 3 | E-P | | 35–65 | 525–975 | 6 |

TABLE VII — Continued

| Block Sequence | Copolymer Block | Homopolymer Block | Molar Ratio of Feed | Feed Rate of Monomers (ml./min.) | Feed Time (mins.) |
|---|---|---|---|---|---|
| 4 | | E | 100 | 975 | 3 |
| 5 | E-P | | 35–65 | 525–975 | 10 |
| 6 | | E | 100 | 975 | 4 |
| 7 | E-P | | 35–65 | 525–975 | 10 |

Forty grams of crystallizable stereoblock rubbery copolymer were isolated according to the procedure described in Example 1. The properties of this stereoblock copolymer are tabulated in Table IX.

EXAMPLE 13.

A crystallizable stereoblock rubbery copolymer of alternating blocks of amorphous ethylene-propylene copolymer (E-P) and crystallizable polyethylene homopolymer (E) was prepared in the presence of hydrogen gas. The same catalytic system and polymerization conditions were employed as described in Example 1, the only difference being that, during the polymerization, a constant feed of about 300 ml./min. of hydrogen gas was introduced into the polymerization flask. The polymerization temperature throughout was 25°–35°C. and the polymerization steps were carried out in the order shown in Table VIII.

Table VIII

| Block Sequence | Copolymer Block | Homopolymer Block | Molar Ratio of Feed | Feed Rate of Monomers (ml./min.) | Feed Time (mins.) |
|---|---|---|---|---|---|
| 1 | E-P | | 50–50 | 750–750 | 2 |
| 2 | | E | 100 | 750 | 2 |
| 3 | E-P | | 50–50 | 750–750 | 4 |
| 4 | | E | 100 | 750 | 3 |
| 5 | E-P | | 50–50 | 750–750 | 5 |
| 6 | | E | 100 | 750 | 4 |
| 7 | E-P | | 50–50 | 750–750 | 10 |

Fifty grams of crystallizable stereoblock rubbery copolymer were isolated according to the procedure outlined in Example 1. The physical properties of this stereoblock copolymer are tabulated in Table IX. As shown therein, the intrinsic viscosity of the stereoblock copolymer of this example is lower than the intrinsic viscosity of the stereoblock copolymers of all the other examples. This demonstrates another general modification that may be applied to the polymerization method of 1-olefins to prepare the crystallizable stereoblock rubbery copolymers of this invention with varying tailor-made properties.

EXAMPLE 14.

A random non-crystallizable ethylene-propylene rubbery copolymer was prepared using the same catalytic system and conditions as in Example 1, except that, during the entire polymerization period, a constant molar ratio of ethylene to propylene (60/40) was fed into the reaction flask at a rate of 1500 ml./min. After a total polymerization time of 40 minutes, 100 grams of random copolymer was isolated by the same method as described in Example 1. The properties of this copolymer are tabulated in Table IX.

The purpose of this example was to compare the physical and elastomeric properties of a random copolymer with whose of the stereoblock copolymers of this invention.

It is to be understood that the above described embodiments are merely illustrative of this invention. Numerous variations and modifications may be devised by those skilled in the art without departing from the spirit and scope of the invention which is to be determined by the appended claims. In Table IX following, the physical and mechanical properties of the copolymers prepared according to the preceding examples are listed.

TABLE IX

SUMMARY OF PHYSICAL AND MECHANICAL PROPERTIES

| | EXAMPLE | 1 | 2 | 3 | 4 | 5 | 6 | 7 |
|---|---|---|---|---|---|---|---|---|
| 1. | Weight Ratio of 1-olefins in the copolymer (as determined by I.R. Analysis) | E 50 / P 50 | E 39 / P 61 | E 48 / P 52 | E 39 / P 61 | E 43 / P 57 | E 54 / P 46 | E 48 / P 52 |
| 2. | Intrinsic Viscosity (Tetralin, 135°C.) | 3.6 | 4.4 | 2.8 | 3.4 | 3.4 | 3.5 | 4.1 |
| 3. | Crystallinity Index (X-ray analysis) | 2 | 1 | 0 | 2 | 1 | 3 | 4 |
| 4. | Stress-Strain Characteristics: | | | | | | | |
| | a) Raw Polymer | | | | | | | |
| | Stress at 300% Elong. (psi) | 150 | 110 | 75 | 210 | — | 190 | 180 |
| | Stress at 500% Elong. (psi) | 350 | 410 | — | — | — | — | 250 |
| | Tensile strength (psi) | 700 | 600 | 225 | 385 | — | 750 | 670 |
| | Elongation at break (%) | 800 | 1100 | 1400 | 1100 | — | 760 | 800 |
| | b) Vulcanizate | | | | | | | |
| | Stress at 300% Elong. (psi) | 1500 | 1270 | 1400 | 1300 | 800 | 1440 | — |
| | Tensile strength (psi) | 4450 | 3750 | 3900 | 3100 | 3530 | 3600 | — |
| | Elongation at break (%) | 540 | 540 | 570 | 490 | 670 | 470 | — |
| 5. | Hardness, Shore A. | 67 | 62 | 68 | 66 | 58 | 65 | — |

TABLE IX — Continued

SUMMARY OF PHYSICAL AND MECHANICAL PROPERTIES

| EXAMPLE | | 8 | 9 | 10 | 11 | 12 | 13 | 14 |
|---|---|---|---|---|---|---|---|---|
| 1. | Weight Ratio of 1-olefins in the copolymer (as determined by I.R. Analysis) | E 55 / P=45 | — | E 31 / P 69 / B=- | — | E 48 / P=52 | E 65 / P=35 | E 45 / P=55 |
| 2. | Intrinsic Viscosity (Tetralin, 135°C.) | 3.2 | 3.4 | 3.4 | 4.9 | 4.5 | 1.2 | 3 |
| 3. | Crystallinity Index (X-ray analysis) | 4 | 3 | 2.5 | 0 | 0 | 3 | 1 |
| 4. | Stress-Strain Characteristics: | | | | | | | |
| | a) Raw Polymer | | | | | | | |
| | Stress at 300% Elong. (psi) | 225 | 90 | 145 | — | 110 | — | 100 |
| | Stress at 500% Elong. (psi) | 340 | 130 | 190 | — | 110 | — | 105 |
| | Tensile strength (psi) | 820 | 310 | 300 | — | 550 | — | 190 |
| | Elongation at break (%) | 740 | 870 | 800 | — | 890 | — | >1400 |
| | b) Vulcanizate | | | | | | | |
| | Stress at 300% Elong. (psi) | — | 870 | 1040 | 830 | 1100 | 2320 | 1250 |
| | Tensile strength (psi) | — | 1820 | 1220 | 1190 | 2000 | 2350 | 3300 |
| | Elongation at break (%) | — | 650 | 340 | 410 | 400 | 330 | 550 |
| 5. | Hardness, Shore A. | — | 60 | 66 | 56 | 50 | 75 | 64 |

Having thus described my invention, what I claim and desire to secure by Letters Patent is:

1. A crystallizable stereoblock rubbery copolymer, said stereoblock copolymer being amorphous in the undeformed state and capable of crystallization upon stretching and having at least three successive and alternating polymeric blocks, one of said polymeric blocks being an amorphous non-crystallizable atactic copolymer of (1) a monomer selected from the group consisting of ethylene and propylene and (2) a dissimilar 1-olefin having from 3 to 12 carbon atoms, the molar ratio of said monomer to said 1-olefin being from 20:80 to 80:20, another of said polymeric blocks being selected from the group consisting of a crystallizable homopolymer of a 1-olefin having from 2 to 12 carbon atoms and a crystallizable copolymer of (1) a monomer selected from the group consisting of ethylene and propylene and (2) a dissimilar 1-olefin having from 3 to 12 carbon atoms, the molar ratio of said monomer to said 1-olefin being in the ranges from 5:95 to 20:80 or 80:20 to 95:5.

2. A crystallizable stereoblock rubbery copolymer, said stereoblock copolymer being amorphous in the undeformed state and capable of crystallization upon stretching, comprising at least three successive and alternating polymeric blocks, one of said polymeric blocks being an amorphous non-crystallizable atactic copolymer of (1) a monomer selected from the group consisting of ethylene and propylene and (2) a dissimilar 1-olefin having from 3 to 12 carbon atoms, the molar ratio of said monomer to said 1-olefin ranging from about 20:80 to about 80:20 and the total number of monomer and 1-olefin units ranging from 100 to about 2000, another of said polymeric blocks being a crystallizable homopolymer of a 1-olefin having from 2 to 12 carbon atoms.

3. The crystallizable stereoblock rubbery copolymer of claim 2 wherein the crystallizable homopolymer block consists of polyethylene having a total number of ethylene units ranging from about 20 to about 200.

4. The crystallizable stereoblock rubbery copolymer of claim 2 wherein the crystallizable homopolymer block consists of a polymerized 1-olefin having from 3 to 12 carbon atoms, said homopolymer block having a total number of 1-olefin units ranging from about 200 to about 1000.

5. The crystallizable stereoblock rubbery copolymer of claim 2 wherein the amorphous non-crystallizable copolymer block consists of ethylene and a member selected from the group consisting of propylene, butene-1 and dodecene-1.

6. A crystallizable stereoblock rubbery copolymer, said stereoblock copolymer being amorphous in the undeformed state and capable of crystallization upon stretching, comprising from about 7 to about 13 successive and alternating polymeric blocks of (1) an amorphous non-crystallizable atactic copolymer block of ethylene and propylene, the molar ratio of ethylene to propylene ranging from about 20:80 to about 80:20 and the total number of ethylene and propylene units ranging from about 100 to about 2,000, and (2) a crystallizable homopolymer block of a member selected from the class of polyethylene, polypropylene and polybutene-1.

7. A crystallizable stereoblock rubbery copolymer, said stereoblock copolymer being amorphous in the undeformed state and capable of crystallization upon stretching, comprising at least two successive and alternating polymeric blocks, one of said polymeric blocks being an amorphous non-crystallizable atactic copolymer of (1) a monomer selected from the group consisting of ethylene and propylene and (2) a dissimilar 1-olefin having from 3 to 12 carbon atoms, the molar ratio of said monomer to said 1-olefin ranging from about 20:80 to about 80:20 and the total number of monomer and 1-olefin units ranging from about 100 to about 2000, another of said polymeric blocks being a crystallizable copolymer of (1) a monomer selected from the group consisting of ethylene and propylene and (2) a dissimilar 1-olefin having from 3 to 12 carbon atoms, the molar ratio of said monomer to said 1-olefin being in the ranges from 5:95 to 20:80 or 80:20 to 95:5.

8. The crystallizable stereoblock rubbery copolymer of claim 7 wherein the crystallizable copolymer block consists of ethylene and a higher 1-olefin with from 3 to 12 carbon atoms, the total number of ethylene and higher 1-olefin monomer units ranging from about 100 to about 2000.

9. A crystallizable stereoblock rubbery copolymer, said stereoblock copolymer being amorphous in the undeformed state and capable of crystallization upon stretching, comprising from about 5 to about 11 successive and alternating polymeric blocks of (1) an amorphous non-crystallizable atactic copolymer block of ethylene and propylene, the molar ratio of ethylene to propylene ranging from about 20:80 to about 80:20 and the total number of ethylene and propylene units ranging from about 100 to about 2000, and (2) a crystallizable copolymer block of ethylene and propylene, the molar ratio of ethylene to propylene being in the ranges from 5:95 to 20:80 or 80:20 to 95:5.

10. A vulcanizate of a crystallizable stereoblock rubbery copolymer, said stereoblock copolymer being amorphous in the undeformed state and capable of crystallization upon stretching and having at least three successive and alternating polymeric blocks, one of said polymeric blocks being an amorphous non-crystallizable atactic copolymer of (1) a monomer selected from the group consisting of ethylene and propylene and (2) a dissimilar 1-olefin having from 3 to 12 carbon atoms, the molar ratio of said monomer to said 1-olefin being from 20:80 to 80:20 another of said polymeric blocks being selected from the group consisting of a crystallizable homopolymer of a 1-olefin having from 2 to 12 carbon atoms and a crystallizable copolymer of (1) a monomer selected from the group consisting of ethylene and propylene and (2) a dissimilar 1-olefin having from 3 to 12 carbon atoms, the molar ratio of said monomer to said 1-olefin being in the ranges from 5:95 to 20:80 or 80:20 to 95:5.

11. A method of making crystallizable stereoblock rubbery copolymers, said stereoblock copolymers being amorphous in the undeformed state and capable of crystallization upon stretching, by block polymerization of 1-olefin having from 2 to 12 carbon atoms, which comprises forming successive and alternating polymeric blocks, one such polymeric block being formed by contacting simultaneously (1) a monomer selected from the group consisting of ethylene and propylene and (2) a dissimilar 1-olefin having from 3 to 12 carbon atoms with a non-stereospecific catalyst in an inert liquid hydrocarbon solvent at a suitable polymerization temperature between 0° C. and 100° C., sufficient of said monomer and said 1-olefin being charged so that the polymeric block thus formed is an amorphous non-crystallizable atactic copolymer from 100 to 2000 monomer units and in which the molar ratio of said monomer to said 1-olefin is from 20:80 to 80:20, and another such polymeric block being formed by contacting an individual 1-olefin having from 2 to 12 carbon atoms under the same polymerization conditions, sufficient of said 1-olefin being charged so that said other polymeric block thus formed is a crystallizable homopolymer containing from 20 to 200 monomer units in the case of ethylene and from 200 to 1000 monomer units in the case of 1-olefins having from 3 to 12 carbon atoms, and recovering a solid crystallizable stereoblock rubbery copolymer thus produced of at least three successive and alternating polymeric blocks, said non-stereospecific catalyst comprising an ionic-coordination complex of the Ziegler-type capable of polymerizing alpha-olefins in atactic isomery.

12. The method of claim 11 wherein said non-stereospecific catalyst is present in a range of from about 0.001 to about 0.1 mole per liter of solvent, and is a member selected from the group consisting of (1) mixtures of vanadium oxytrihalide and a member selected from the group consisting of aluminum trialkyl, alkyl aluminum dihalide and dialkyl aluminum halide, and (2) mixtures of titanium tetrahalide and a member selected from the group consisting of lithium aluminum tetraalkyl, and lithium alkyl-aluminum trialkyl.

13. A method of making crystallizable stereoblock rubbery copolymers, said stereoblock copolymers being amorphous in the undeformed state and capable of crystallization upon stretching, by block polymerization which comprises forming successive and alternating polymeric blocks, one such polymeric block being formed by contacting simultaneously ethylene and a higher 1-olefin having from 3 to 12 carbon atoms with a non-stereospecific catalyst in an inert liquid hydrocarbon solvent at a suitable polymerization temperature between 20° C. and 35° C., sufficient of the ethylene and said 1-olefin being charged so that the polymeric block thus formed is an amorphous non-crystallizable atactic copolymer containing from 100 to 2000 monomer units and in which the molar ratio of ethylene to said 1-olefin is from 20:80 to 80:20, and another such polymeric block being formed by contacting an 1-olefin having from 2 to 12 carbon atoms under the same polymerization conditions, sufficient of said 1-olefin being charged so that said other polymeric block thus formed is a crystallizable homopolymer containing from 20 to 200 monomer units in the case of ethylene and from 200 to 1000 monomer units in the case of 1-olefins having from 3 to 12 carbon atoms, and recovering a solid crystallizable stereoblock rubbery copolymer thus produced of from about 7 to about 13 successive and alternating polymeric blocks, said non-stereospecific catalyst comprising a member selected from the group consisting of (1) mixtures of vanadium oxytrihalide and a member selected from the group consisting of aluminum trialkyl, alkyl aluminum dihalide and dialkyl aluminum halide, and (2) mixtures of titanium tetrahalide and a member selected from the group consisting of lithium aluminum tetraalkyl and lithium alkyl-aluminum trialkyl.

14. The method of claim 13 wherein said higher 1-olefin is a member selected from the group consisting of propylene, butene-1 and dodecene-1.

15. A method of making crystallizable stereoblock rubbery copolymers, said stereoblock copolymers being amorphous in the undeformed state and capable of crystallization upon stretching, by block polymerization of 1-olefins having from 2 to 12 carbon atoms, which comprises forming successive and alternating polymeric blocks, one such polymeric block being formed by contacting simultaneously (1) a monomer selected from the group consisting of ethylene and propylene and (2) a dissimilar 1-olefin having from 3 to 12 carbon atoms with a non-stereo-specific catalyst in an inert liquid hydrocarbon solvent at a suitable polymerization temperature between 0° C. and 100° C., sufficient of said monomer and said 1-olefin being charged so that the polymeric block thus formed is an amorphous non-crystallizable atactic copolymer containing from 100 to 2000 monomer units and in which the molar ratio of said monomer to said 1-olefin is from 20:80 to 80:20, and another such polymeric block being formed by contacting simultaneously (1) a monomer selected from the group consisting of ethylene and propylene and (2) a dissimilar 1-olefin having from 3 to 12 carbon atoms under the same polymerization conditions, sufficient of said monomer and said 1-olefin being charged so that said other polymeric block thus formed is a crystallizable copolymer containing from 100 to 2000 monomer units and in which the molar ratio of said monomer to said 1-olefin is in the ranges from 5:95 to 20:80 or 80:20 to 95:5, and recovering a solid crystallizable stereoblock rubbery copolymer thus produced of at least two successive and alternating polymeric blocks, said non-stereo-specific catalyst comprising an ionic-coordination complex of the Ziegler-type capable of polymerizing alpha-olefins in atactic isomery.

16. A method of making crystallizable stereoblock rubbery copolymers, said stereoblock copolymers being amorphous in the undeformed state and capable of crystallization upon stretching, by block polymerization of ethylene and a higher 1-olefin having from 3 to 12 carbon atoms which comprises forming successive and alternating polymeric blocks, one such polymeric block being formed by contacting simultaneously ethylene and said higher 1-olefin with a non-stereospecific catalyst in an inert liquid hydrocarbon solvent at a suitable polymerization temperature between 20° C. and 35° C., sufficient ethylene and said 1-olefin being charged so that the polymeric block thus formed is an amorphous non-crystallizable atactic copolymer containing from 100 to 2000 monomer units and in which the molar ratio of ethylene to said 1-olefin is from 20:80 to 80:20, and another such polymeric block being formed by contacting simultaneously ethylene and a higher 1-olefin having from 3 to 12 carbon atoms under the same polymerization conditions, sufficient ethylene and said 1-olefin being charged so that said other polymeric block thus formed is a crystallizable copolymer containing from 100 to 2000 monomer units and in which the molar ratio of ethylene to said 1-olefin is in the ranges from 5:95 to 20:80 or 80:20 to 95:5, and recovering a solid crystallizable stereoblock rubbery copolymer thus produced of from about 5 to about 11 successive and alternating polymeric blocks, said non-stereospecific catalyst comprising a member selected from the group consisting of (1) mixtures of vanadium oxytrihalide and a member selected from the group consisting of aluminum trialkyl, alkyl aluminum dihalide and dialkyl aluminum halide, and (2) mixtures of titanium tetrahalide and a member selected from the group consisting of lithium aluminum tetraalkyl and lithium alkyl-aluminum trialkyl.

17. The method of claim 16 wherein said higher 1-olefin is propylene.

18. A method of making crystallizable stereoblock rubbery copolymers, said stereoblock copolymers being amorphous in the undeformed state and capable of crystallization upon stretching, by block polymerization of 1-olefins having from 2 to 12 carbon atoms which comprises forming successive and alternating polymeric blocks, one of said polymeric blocks being an amorphous non-crystallizable atactic copolymer, in which the molar ratio of said monomer to said 1-olefin is from 20:80 to 80:20, formed by contacting simultaneously (1) a monomer selected from the group consisting of ethylene and propylene and (2) a dissimilar 1-olefin having from 3 to 12 carbon atoms with a non-stereospecific catalyst in an inert liquid hydrocarbon solvent at a polymerization temperature between 0° C. and 100° C., another of said polymeric blocks being selected from the group consisting of crystallizable homopolymers formed by contacting an individual 1-olefin having from 2 to 12 carbon atoms under the same polymerization conditions and crystallizable copolymers, in which the molar ratio of said monomer to said 1-olefin is in the ranges from 5:95 to 20:80 or 80:20 to 95:5, formed by contacting simultaneously (1) a monomer selected from the group consisting of ethylene and propylene and (2) a dissimilar 1-olefin having from 3 to 12 carbon atoms under the same polymerization conditions, said non-stereospecific catalyst comprising an ionic-coordination complex of the Ziegler type capable of polymerizing alpha-olefins in atactic isomery.

* * * * *